(12) United States Patent
Biel et al.

(10) Patent No.: US 7,423,747 B2
(45) Date of Patent: Sep. 9, 2008

(54) FLOATING CUVETTE FOR LENS INSPECTION

(75) Inventors: Roger Biel, Aschaffenburg (DE); Günter Lässig, Obernburg (DE); Peter Hagmann, Erlenbach am Main (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 11/546,833

(22) Filed: Oct. 12, 2006

(65) Prior Publication Data

US 2007/0146698 A1 Jun. 28, 2007

(30) Foreign Application Priority Data

Oct. 13, 2005 (EP) .................... 05022406

(51) Int. Cl.
 *G01N 1/10* (2006.01)
 *G01N 21/01* (2006.01)
(52) U.S. Cl. ...................... 356/246; 356/244
(58) Field of Classification Search ........ None
 See application file for complete search history.

(56) References Cited

U.S. PATENT DOCUMENTS 3,985,445 A * 10/1976 Tagnon .................. 356/125
4,260,252 A * 4/1981 Wittenberg .............. 356/124
6,909,503 B2 * 6/2005 Baske et al. ............. 356/246

FOREIGN PATENT DOCUMENTS

DE 3432002 A1 3/1986
WO WO 03/016855 A1 2/2003

\* cited by examiner

*Primary Examiner*—Michael P Stafira
(74) *Attorney, Agent, or Firm*—Sheng-Hsin Hu

(57) ABSTRACT

The invention relates to a cuvette for an ophthalmic lens, for testing the latter using an optical inspection system, said cuvette comprising a hollow space to be filled with a liquid and has an axis coinciding, in the test position of the cuvette, with the optical axis of an inspection system and, between a first viewing glass at the top and a second viewing glass at the bottom, a removable lens support is arranged in the lower area of the hollow space, so as to allow a free floating inspection of the lens at a defined inspection position when the lens support is removed.

6 Claims, 3 Drawing Sheets

FLOATING CUVETTE FOR LENS INSPECTION

This application claims benefit under 35 USC §119 of European Application No. EP 05022406.2 filed 13 Oct. 2005, the contents of which are incorporated herein by reference.

FIELD OF THE INVENTION

The invention relates to a cuvette for an ophthalmic lens, for testing the latter using an optical inspection system, said cuvette comprising a hollow space to be filled with a liquid and has an axis coinciding, in the test position of the cuvette, with the optical axis of an inspection system and, between a first viewing glass at the top and a second viewing glass at the bottom, a removable lens support is arranged in the lower area of the hollow space, so as to allow a free floating inspection of the lens at a defined inspection position when the lens support is removed.

The invention in particular relates to a cuvette for the optical testing of contact lenses, more particular to a cuvette for the optical testing of soft contact lenses.

BACKGROUND OF THE INVENTION

It is known to produce hard and soft contact lenses in an automated production process with reusable moulds. To ensure the quality of the contact lenses obtained in the automated production process, the finished contact lenses must be optically inspected. However, in particular soft contact lenses are difficult to handle using mechanical means, and it is known to hold these in a water-filled cuvette for the purpose of optical testing.

U.S. Pat. No. 4,260,252 discloses a method and apparatus for immobilizing a contact lens without distortion to facilitate accurate measurement of its physical dimension. The wire-type support member is disposed to interact with the lens through surface tension effects of the liquid to immobilize the lens on the surface of the liquid whereon the lens is floated just out of contact with the support member.

It has been found previously that a contact lens, when inserted into and immersed in a water bath, always orients itself with the concave side facing upwards. Further, it is known, that contact lenses typically have a density at least slightly higher than water, therefore once completely immersed they are slowly sinking to the bottom of a water-filled cuvette. These properties are made use of in the following optical testing methods known in the art.

EP 1105708 A1 discloses a cuvette for optical inspection of ophthalmic lenses with a lens support having an indentation (for positioning the lens on the lens support) and the lens support having an optically finished surface (for avoiding optical distortion). Inspection is carried out while the lens is resting on the optically finished surface of the lens support.

WO 03/016855 A1 discloses a cuvette for lens inspection, said cuvette comprising a hollow space which is filled with a liquid and has an axis coinciding, in the test position of the cuvette, with the optical axis of the inspection system, and, in the test position of the cuvette, the hollow space is delimited from above by a viewing glass for the optical test and has, underneath the viewing glass, a seat, in particular a test trough, for the ophthalmic lens, wherein between viewing glass and test trough at least one insertion channel opens into the hollow space, the ophthalmic lens being able to be inserted into the hollow space through the outer insertion opening of said insertion channel. Inspection is carried out, while the lens is resting on the test trough.

As the upper surface of the test trough has direct contact with the lens, the imperfections of the surface are in the same focal plane of the inspection system as the lens and it may be difficult to distinguish between defects in the contact lens and defects or dirt on or in the test trough.

It is known for these type of inspection systems that it is necessary to ensure that the liquid and the viewing glasses (in particular if they act as the lens support) as they are situated in the optical path are clean and free of imperfections. Further, there must be no air bubbles present between liquid and viewing glasses, in particular in the field of focus of the inspection system. In an industrial production environment it is very often not possible to fully meet these demands.

A remaining problem not solved by the above mentioned inspection systems therefore is the optical quality of the test trough surface facing towards the hollow space, i.e. the lens support. In particular said lens support may have dirt, air bubbles or scratches on said surface, i.e. in the field of focus, which may adversely affect the optical inspection of the lens.

The object of the invention is to eliminate such adverse effects on the optical inspection of the lens as far as possible.

According to the invention, the object is achieved by the fact that the lens support is removed for inspection of the lens, thereby leaving the lens freely floating during optical inspection. Any detrimental effect of dirt, air bubbles or scratches on a surface other than the lens surface, which could adversely affect the optical inspection, are thereby eliminated.

SUMMARY OF THE INVENTION

Freely floating as used herein is an ophthalmic lens fully immersed in a liquid, without any direct contact to a lens support and without any surface tension effects indirectly contacting the ophthalmic lens to a lens support. Due to gravitational effects and due to the fact that contact lenses typically have a density at least slightly higher than water, once they are completely immersed and once they are not further supported by a (then removed) lens support, they slowly start sinking to the bottom of said water-filled container.

Preferably, the invention in a first aspect relates to a cuvette for testing an ophthalmic lens, in particular a soft contact lens, using an optical inspection system, said cuvette comprising a hollow space to be filled with a liquid, preferably water, and, in the test position of the cuvette, the hollow space is delimited from above by a first viewing glass and from below by a second viewing glass. In the lower area of the hollow space a removable lens support is arranged in which the contact lens is supported in an initial inspection position, when the cuvette is in a test position.

According to one embodiment of the invention, the removable lens support is an iris diphragm. Preferably, the lamella of the iris diphragm are removable in a horizontal plane by a mechanical means.

According to another embodiment of the invention, the removable lens support is a wire type support. Preferably, the wires of the wire type support are removable in a folding motion away from the lens by a mechanical means.

In a further embodiment, the iris diphragm and the wire type support are removable by a magnetic means.

A removable lens support as used herein, is a lens support, which in an initial position is capable of supporting an ophthalmic lens, and once removed, releases the ophthalmic lens to freely float in the surrounding liquid. To allow for good inspection results of the freely floating ophthalmic lens, it is important, that the removal of the lens support is as smooth as possible, i.e. does not disturb the liquid and/or the initial position of the ophthalmic lens. Further, a removable lens support as used herein, is a lens support, which in the removed position is removed entirely from the area wherein the lens is to be inspected with an optical inspection system, i.e. at least from the diameter of the lens along the optical axis of the optical inspection system.

It has been found that a preferred removable lens support is an iris diaphragm, as it allows a smooth removal, which does not disturb the liquid and/or the initial position of the ophthalmic lens for inspection with an optical inspection system.

As described previously, a contact lens, when inserted into a water bath, always orients itself with the concave side facing upwards. Typically, contact lenses have a density at least slightly higher than water, therefore they are slowly sinking to the bottom of a cuvette. The speed of sinking is dependent on the diameter of the cuvette as well as on the diameter of the contact lens. Typically, a soft contact lens has a diameter of 10 mm to 15 mm, preferably around 14 mm. The sinking speed in the cuvette is from 10 mm/s to 12 mm/s for a cuvette with a diameter of at least twice the size of the contact lens. The closer the diameter of the cuvette is to the diameter of the contact lens, the slower is the speed of sinking.

The invention therefore further relates to a method for testing an ophthalmic lens arranged in a cuvette using an optical inspection system, wherein a hollow space of the cuvette is filled with a liquid, e.g. water, and wherein the hollow space is delimited from above by a first viewing glass and from below by a second viewing glass, and wherein in the lower area of the hollow space a removable lens support is arranged.

The method comprises the following steps:

fully immersing an ophthalmic lens in the liquid in the hollow space of the cuvette, self-positioning of the lens on the removable lens support in an initial inspection position, removing the lens support, so as to cause the lens to freely float in the inspection position, carrying out the optical inspection using the optical inspection system while the lens is freely floating in or sinking along the optical axis of the optical inspection system, returning the removable lens support to its initial position, thereby again supporting the lens.

The self-positioning of the lens can be realized by immersing the lens in the liquid and its sinking towards the bottom of the cuvette. With the removable lens support being arranged in the lower area of the cuvette and in its initial position being arranged as the lowest point accessible to the lens, the lens will sink until it rests on the removable lens support in the initial inspection position. The bottom area of the cuvette only is accessible to the lens once the lens support is removed, i.e. the lens will start sinking further to the bottom upon the lens support being removed.

The optical inspection can be carried out by taking one or more pictures of the lens or a part of the lens, using brightfield, dark-field and/or phase-contrast illumination. The image received by a suitable camera is then further processed and analyzed by means of a software, e.g. to identify defects.

After inspection the lens support is returned to its initial position. To allow for the lens to be supported again on the lens support, it has to be pushed up again by the amount it has been sinking towards the bottom while the lens support was removed.

A lens again being supported on the lens support after inspection can be of advantage with respect to removing the lens by a gripper device, in particular in an automated production process.

Preferably, the optical inspection of the lens using the optical inspection system is carried out immediately after removal of the lens support, while the lens is freely floating in or sinking along the optical axis of the optical inspection system. The lens support is returned to its previous position immediately after optical inspection of the lens.

The time between the removal of the lens support and the return to its previous position is from 0.01 s to 0.2 s, preferably from 0.02 s to 0.1 s. Subsequently, the time for optical inspection is from 0.001 s to 0.01 s, preferably at a maximum around 0.005 s.

With an estimated speed of sinking of 10 mm/s with the lens support being removed, the lens is sinking towards the bottom less than 200 microns, preferably less than 100 microns compared to its initial position on the lens support before removal thereof. For the very short time of optical inspection, the lens stays in the inspection position with an accuracy of 1 micron to 10 microns, preferably 1 micron to 5 microns.

An iris diaphragm in closing motion will push up the lens along its convex surface, whereas a wire-type support will push up the lens with the upward folding motion.

Preferably, the field of focus of the optical inspection system is limited to a few millimeters around the inspection position, with a depth of field of a few millimeters only, preferably less than 5 mm. The viewing glasses of the cuvette are arranged a couple of millimeters away from the inspection position where the image is taken, preferably at least 10 mm, more preferably 20 mm to 40 mm away.

An optical inspection system as used herein comprises at least an emitting means (e.g. a light source) and a detecting means (e.g. a camera) which are arranged along an optical axis through the ophthalmic lens to be inspected. Further, there may be arranged along the optical axis a first viewing glass and a second viewing glass, the both delimiting a cuvette filled with a liquid, as well as contact lens immersed in the liquid and either supported in an initial inspection position or freely floating along the optical axis.

A preferred optical inspection system comprises a CCD camera above the upper viewing glass or below the lower viewing glass, an LED illumination device arranged along the optical axis, at the opposite side of the CCD camera. More preferably, the optical inspection system is capable of performing bright and dark field illumination of the contact lens and of performing an analysis of the contact lens image respectively.

A cuvette and method according to the invention can be used advantageously in a system for testing contact lenses, preferably within an automated production process (for example in a test module), as is characterized by the features of the independent use claim.

BRIEF DESCRIPTION OF THE DRAWINGS

The invention is explained in greater detail below with reference to the schematic drawings, in which.

DETAILED DESCRIPTION OF THE INVENTION

Figure 1:
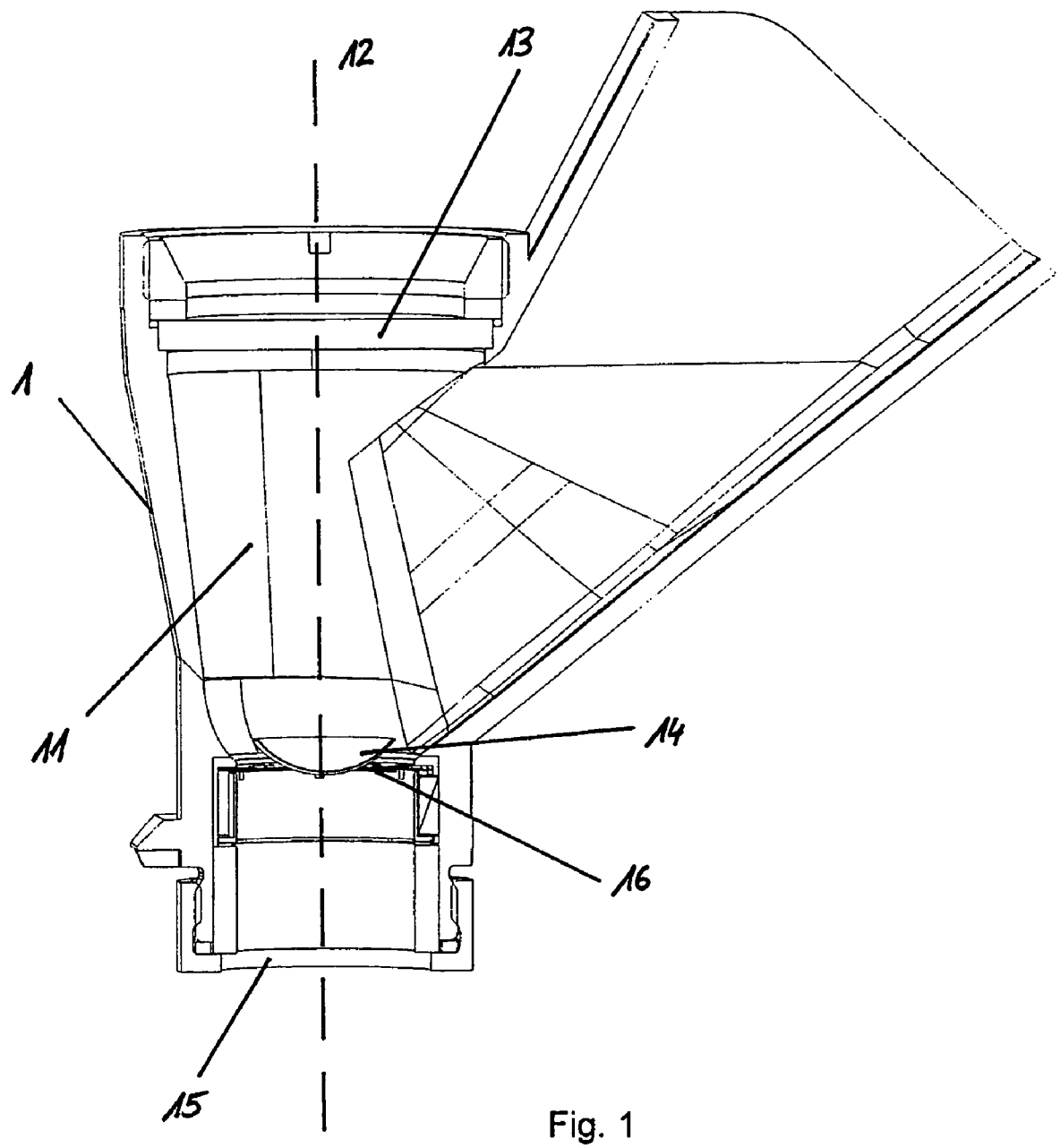
FIG. 1 shows a section through a cuvette according to the invention with a contact lens on a removable lens support.

The cuvette 1 shown in FIG. 1 has a hollow space 11 which preferably is filled with a liquid, for example water. The hollow space extends along an axis 12 which, in the test position of the cuvette, coincides with the optical axis of the optical inspection system (not shown). The hollow space 11 is delimited by a first (upper) viewing glass 13 at the top and by a second (lower) viewing glass 15 at the bottom. In the lower area of the hollow space a removable lens support 16 is arranged by which the contact lens 14 is supported in an initial inspection position, when the cuvette is in a test position (shown in FIG. 1).

Figure 2:
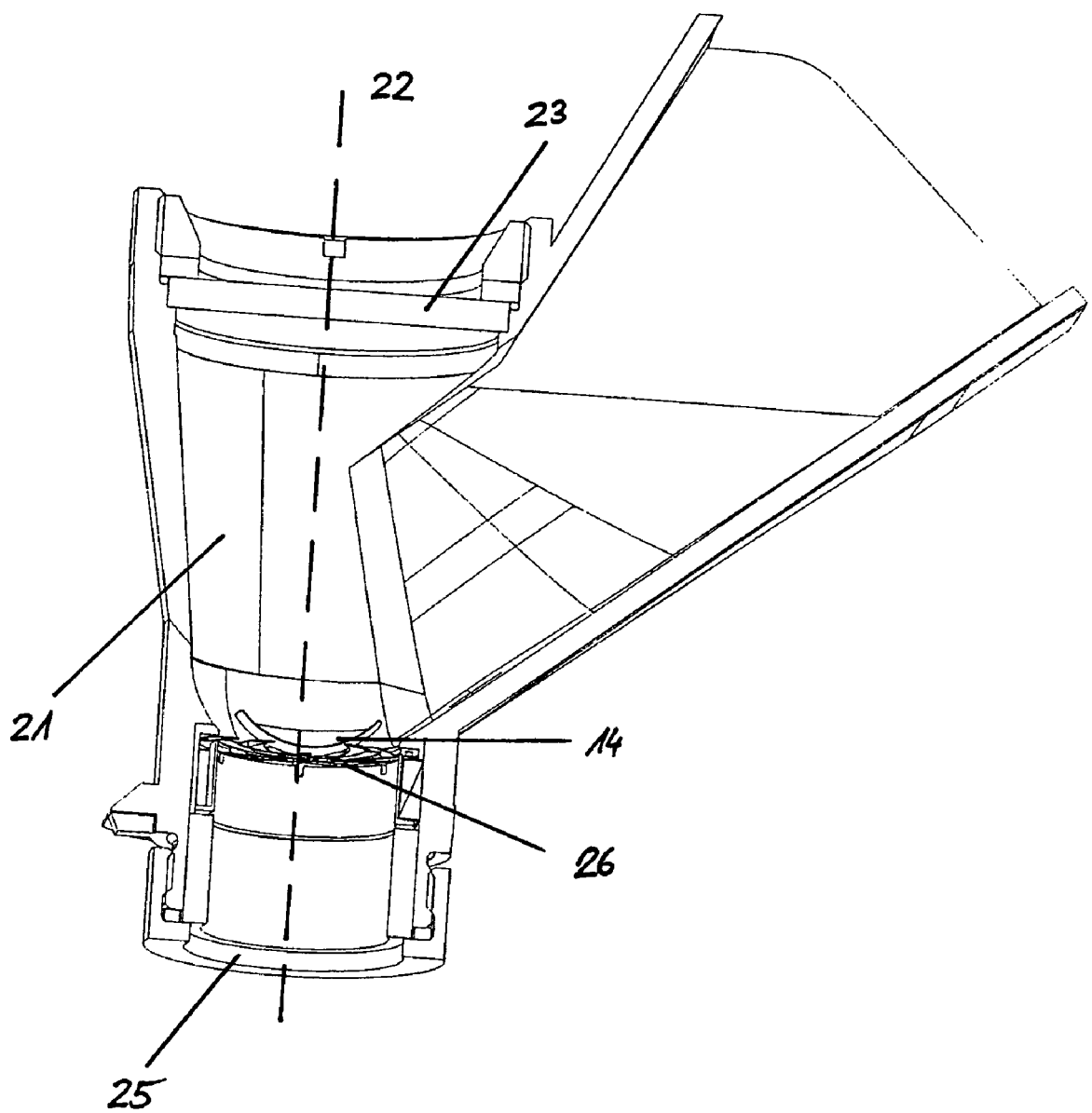
FIG. 2 shows a section through a cuvette according to FIG. 1 wherein the lens support is an iris diphragm.
Figure 3:
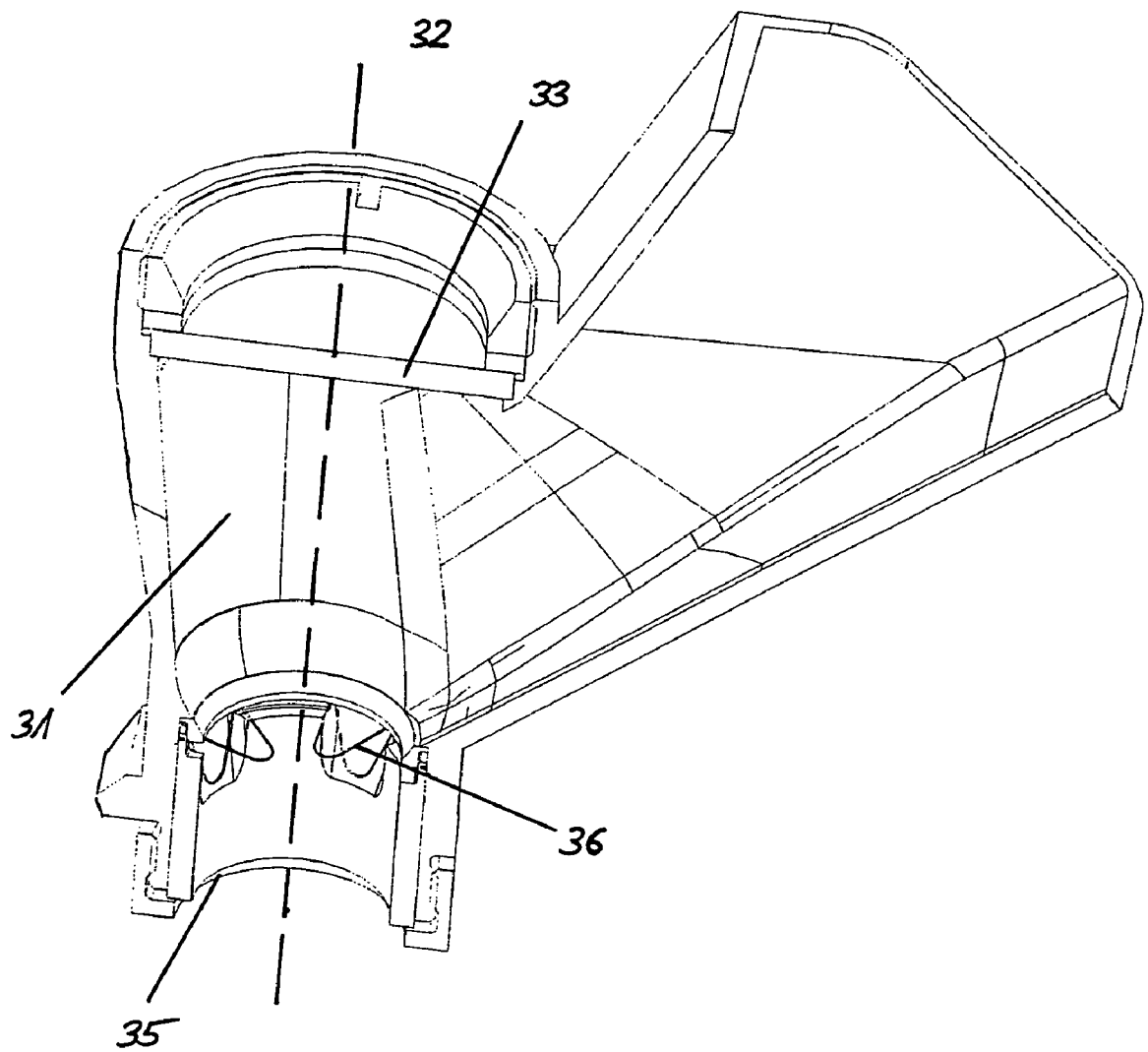
FIG. 3 shows a section through a cuvette according to FIG. 1 wherein the lens support is a wire type support.

The cuvettes shown in FIGS. 2 and 3 likewise have a hollow space 21, 31 which is filled with a liquid, for example water. The hollow space extends along an axis 22, 32 which, in the test position of the cuvette, coincides with the optical axis of the optical inspection system (not shown). The hollow space 21, 31 is delimited by a first viewing glass 23, 33 at the top and by a second viewing glass 25, 35 at the bottom. The lower area of the hollow space is configured with a removable lens support 26, 36 in which the contact lens 14 is received in an initial inspection position. In FIG. 2, the lens support is an iris diphragm, whereas in FIG. 3 the lens support is a wire type support.

In principle, the first viewing glass 13 at the top, as well as the second viewing glass 15 at the bottom can form a part of an optical lens. In this way, an overall compact optical structure for the optical inspection system can be obtained.

The cuvette and method according to the invention allow to generate very high quality images of a contact lens for lens inspection, avoiding any additional surface other than the surface of the contact lens in the field of focus of the optical inspection system. Thereby adverse effects to the optical inspection of the lens are eliminated as far as possible.

The invention claimed is:

1. Cuvette for testing an ophthalmic lens, using an optical inspection system, said cuvette comprising a hollow space to be filled with a liquid and, in the test position of the cuvette, the hollow space is delimited from above by a first viewing glass and from below by a second viewing glass, characterized in that in the lower area of the hollow space a removable lens support is arranged by which the contact lens is supported in an initial inspection position, when the cuvette is in a test position, wherein the removable lens support is an iris diaphragm, and wherein the lamella of the iris diphragm are removable in a horizontal plane.

2. Cuvette for testing an ophthalmic lens, using an optical inspection system, said cuvette comprising a hollow space to be filled with a liquid and, in the test position of the cuvette, the hollow space is delimited from above by a first viewing glass and from below by a second viewing glass, characterized in that in the lower area of the hollow space a removable lens support is arranged by which the contact lens is supported in an initial inspection position, when the cuvette is in a test position, characterized in that the removable lens support is a wire type support, wherein the wires of the wire type support are removable in a folding motion away from the lens.

3. Method for testing an ophthalmic lens arranged in a cuvette using an optical inspection system, wherein a hollow space of the cuvette is filled with a liquid, the hollow space being delimited from above by a first viewing glass and from below by a second viewing glass, and wherein in the lower area of the hollow space a removable lens support is arranged, the method comprising the following steps:
   fully immersing the ophthalmic lens in the liquid,
   self-positioning of the lens on the removable lens support in an initial inspection position,
   removing the lens support so as to cause the lens to freely float first in the initial inspection position and then along the optical axis of the inspection system,
   carrying out the optical inspection using the optical inspection system while the lens is freely floating in the initial inspection position or along the optical axis of the inspection system,
   returning the removable lens support to its previous position, thereby again supporting the lens.

4. Method according to claim 3, wherein the optical inspection using the optical inspection system is carried out immediately after full removal of the lens support, while the lens is freely floating in the inspection position or along the optical axis of the inspection system, wherein the time for the optical inspection is from 0.001 s to 0.01 s.

5. Method according to claim 4, wherein the lens support is returned to its previous position immediately after optical inspection of the lens, wherein the time between the full removal of the lens support and the return to its initial position is from 0.01 s to 0.2 s.

6. Method according to claim 3, wherein with the lens support being removed, the lens is sinking towards the bottom less than 200 microns compared to its initial position on the lens support before removal thereof.

* * * * *